(12) United States Patent
Ohshima et al.

(10) Patent No.: US 8,536,819 B2
(45) Date of Patent: Sep. 17, 2013

(54) POWER SUPPLY DEVICE

(75) Inventors: Shunzou Ohshima, Kosai (JP); Teruki Yamauchi, Kosai (JP)

(73) Assignee: Yazaki Corporation, Tokyo (JP)

( * ) Notice: Subject to any disclaimer, the term of this patent is extended or adjusted under 35 U.S.C. 154(b) by 198 days.

(21) Appl. No.: 13/129,441

(22) PCT Filed: Dec. 24, 2009

(86) PCT No.: PCT/JP2009/071491
§ 371 (c)(1),
(2), (4) Date: May 16, 2011

(87) PCT Pub. No.: WO2010/074176
PCT Pub. Date: Jul. 1, 2010

(65) Prior Publication Data
US 2011/0221376 A1    Sep. 15, 2011

(30) Foreign Application Priority Data
Dec. 25, 2008  (JP) .................. 2008-329693

(51) Int. Cl.
*G05B 11/28* (2006.01)
*H03K 3/354* (2006.01)
*H03L 7/00* (2006.01)
*H02P 7/285* (2006.01)

(52) U.S. Cl.
USPC ........... 318/599; 388/829; 331/113 R; 331/13

(58) Field of Classification Search
USPC ............... 318/500–510, 599; 331/113 R, 13; 388/829
See application file for complete search history.

(56) References Cited

U.S. PATENT DOCUMENTS
2004/0218405 A1 * 11/2004 Yamada et al. ............... 363/18

FOREIGN PATENT DOCUMENTS
| JP | 64-89993 A | | 4/1989 |
| JP | 11-168899 A | | 6/1999 |
| JP | 11168899 A | * | 6/1999 |
| JP | 2000-201475 A | | 7/2000 |
| JP | 2005-158870 A | | 6/2005 |
| JP | 2008-099474 A | | 4/2008 |

OTHER PUBLICATIONS

International Search Report for PCT/JP2009/071491 dated Mar. 16, 2010[PCT/ISA/210].

* cited by examiner

*Primary Examiner* — Eduardo Colon Santana
*Assistant Examiner* — Bickey Dhakal
(74) *Attorney, Agent, or Firm* — Sughrue Mion, PLLC

(57) ABSTRACT

To provide a power supply device which can reduce energy loss caused due to the forward-direction voltage of a flywheel diode. In a load circuit for subjecting an electronic switch T1 provided between a DC power supply VB and a motor M1 to the PWM control to thereby drive the motor M1, a MOSFET (T2) is provided in parallel to the motor M1. A parasitic diode Dp of the MOSFET (T2) is provided in a manner that its forward direction is in opposite to the flowing direction of a load current ID. The MOSFET (T2) is turned on during a part of a period during which the electronic switch T1 is placed in an off state to thereby flow a circulation current flowing through the motor M1 into the MOSFET (T2). Thus, the energy loss can be remarkably reduced as compared with the case of using the flywheel diode.

4 Claims, 4 Drawing Sheets

POWER SUPPLY DEVICE

TECHNICAL FIELD

The present invention relates to a power supply device for controlling an electric power supplied to a motor load by PWM controlling an electronic switch with a desired duty ratio and, in particular, relates to a technique of reducing energy loss due to heat generation.

BACKGROUND ART

Many load circuits have been employed each of which is configured in a manner that an electronic switch such as a MOSFET is provided between a DC power supply and a load, and the MOSFET is subjected to the PWM control to adjust an electric power supplied to the load to thereby control the output of the load (see a patent document 1, for example).

FIG. 4 is a circuit diagram showing the configuration of a load circuit for driving a motor M101, used for a radiator fan etc. to be mounted on a vehicle, by the PWM control. An electronic switch T101 such as a MOSFET is provided between the motor M101 and the positive electrode terminal of a DC power supply VB (for example, a battery to be mounted on the vehicle). The inductance of the motor M101 is depicted as LM and an armature resistance thereof is depicted as Ra.

The gate of the electronic switch T101 is connected to a driver 102 via a resistor R101. A charge pump 101 is connected to the driver 102. When the driver 102 is supplied with an input signal having a predetermined on/off cycle, the driver 102 outputs the output voltage of the charge pump 101 to the gate of the electronic switch T101 to thereby drive the electronic switch T101 with a predetermined duty ratio according to the PWM control.

As shown in FIG. 4, supposing that a current flowing through the electronic switch T101 is ID and a current flowing through the motor M101 is IM, the current ID becomes equal to the current IM in the case where the electronic switch T101 is turned on to flow a current through a path from the positive electrode terminal of the DC power supply VB to the negative electrode terminal of the DC power supply VB via the electronic switch T101, the motor M101 and the ground. In this case, the electromagnetic energy of $LM*IM^2/2$ is accumulated in the inductance LM of the motor M101.

When the electronic switch T101 is turned off, the current ID becomes 0. However, the current IM tends to continuously flow due to the inductance LM of the motor M101. In order to flow this current into the motor M101 in a circulation manner, a flywheel diode D101 (hereinafter simply referred a "diode") is provided in parallel to the motor M101. Supposing that a connection point between the electronic switch T101 and the motor M101 is a, the cathode of the diode D101 is connected to the point a and the anode of the diode D101 is grounded.

According to this configuration, the current IM having been flowing through the motor M101 during the on-state of the electronic switch T101 starts to flow in a circulation manner through a path from the motor M101 to the motor M101 via the ground, the diode D101 and the point a when the electronic switch T101 is turned off. Thus, the electromagnetic energy having been accumulated in the inductance LM is converted into the driving torque of the motor M101. In this case, supposing that the current flowing through the diode D101 is a circulation current IF, the circulation current IF becomes equal to the current IM.

The motor current IM (=IF) flows through the armature resistor Ra and the diode D101 to thereby cause a power loss. Since the power loss at the armature resistor Ra causes the generation of the motor driving torque, this power loss has an effects of suppressing the reduction of the rotation speed of the motor M101 during the off period of the electronic switch T101. On the other hand, a power loss generated in the diode D101 is represented by VF* IF supposing that the voltage drop in the forward direction of the diode D101 is VF. Since this power loss is converted into heat to thereby merely increase the temperature of the diode D101, this power loss does not contribute to the maintaining of the rotation speed of the motor M101.

When the electromagnetic energy accumulated in the inductance LM of the motor M101 disappears as the power loss of the armature resistor Ra and the diode D101, the voltage at the point a increases to the generation voltage due to the inertial force of the motor armature. In this case, the diode D101 prevents a current from flowing toward the ground from the point a.

That is, a part of the electromagnetic energy accumulated in the inductance LM is converted into the torque of the motor M101 and the remaining of the electromagnetic energy is converted into heat generated by the diode D101. Thus, if it becomes possible to reduce the power loss of the diode D101, the conversion ratio into the torque of the motor M101 can be increased, whereby the energy can be utilized effectively and an amount of heat generated from the diode D101 can be reduced.

RELATED ART DOCUMENT

Patent Literature

Patent literature 1: JP-A-11-168899

SUMMARY OF INVENTION

Technical Problem

As described above, in the load circuit of the related art, in the case of PMC controlling the motor M101 by using the electronic switch T101, when the electronic switch T101 is changed to the off state from the on state, the current IM generated by the electromagnetic energy accumulated in the inductance LM is flown into the motor M101 in the circulation manner via the flywheel diode D101. However, in the case of employing this system, the flywheel diode D101 generates heat, and hence the energy loss is generated due to the heat. Thus, it has been increasingly demanded to reduce such the energy loss.

This invention has been made in order to solve such the problem of the related art and an object of this invention is to provide a power supply device which can reduce energy loss caused due to the forward direction voltage of a flywheel diode.

Solution to Problem

In order to achieve the above object, according to the present invention, there is provided a power supply device, comprising:

an electronic switch (T1) provided on a wiring which connects a DC power supply (VB) to a motor load (M1);

a driving portion that controls the electronic switch with PWM to drive the motor load;

a semiconductor element (T2) that has a parasitic diode and is disposed in parallel to the motor load so that a forward direction of the parasitic diode is in opposite to a flowing direction of a current flowing through the motor load; and a control portion that controls the semiconductor element so as to be turned on during a part of a period during which the electronic switch is placed in an off state under a control with the PWM.

Preferably, in a case where electromagnetic energy accumulated in an inductance of the motor load disappears until the electronic switch is turned on again after the electronic switch is turned off, the part of the period is set to a period from a time point where a voltage at a first connection point (point a) for connecting between the electronic switch and the motor load reduces to a level equal to or lower than a grounding level after the electronic switch is turned off to a time point before the voltage at the first connection point starts increasing due to disappearance of the electromagnetic energy.

Preferably, the semiconductor element includes: a first main electrode which is connected to a first connection point for connecting between the electronic switch and the motor load; a second main electrode which is connected to a ground; and a control electrode to which a control signal is input, the semiconductor element (T2) is turned on when a positive voltage is applied to the control electrode, and the control portion starts applying the positive voltage to the control electrode when the voltage at the first connection point reduces to the level equal to or lower than the grounding level after the electronic switch is shifted to an off state from an on state, and stops application of the positive voltage when a shorter time period has elapsed between a first time period from the application of the positive voltage to a start of increase of the voltage at the first point and a second time period until a constant time period elapses after the application of the positive voltage.

Preferably, the semiconductor element (T2) is an N-type field effect transistor which includes a drain as the first main electrode, a source as the second main electrode, and a gate as the control electrode, the control portion includes a serial connection circuit which is formed by a first resistor (R2) and a transistor (T3), the serial connection circuit is disposed between the DC power supply and the ground, and a control input terminal of the transistor (T3) is connected to the first connection point, a second connection point (point b) for connecting between the first resistor (R2) and the transistor (T3) is connected to the ground via a serial connection circuit formed by a capacitor (C1) and a second resistor (R3), and a third connection point (point c) for connecting between the capacitor (C1) and the second resistor (R3) is connected to a gate of the semiconductor element (T2).

Preferably, the control portion includes: an inverter circuit which generates an inverted signal of a PWM signal; a delay circuit which delays an output signal of the inverter circuit by a predetermined time, and an one-shot multivibrator which outputs an on-signal with a constant time period in synchronous with a rising timing of the PWM signal as a trigger output from the delay circuit.

Advantageous Effects of Invention

In the power supply device according to the invention, the semiconductor element (T2) such as a MOSFET is provided in parallel to the motor load (M1). At the time of driving the motor load by subjecting the electronic switch (T1) to the PWM control, the semiconductor element (T2) is turned on during a part of the period during which the electronic switch (T1) is placed in the off state. Thus, a circulation current flowing through the motor load (M1) flows through the semiconductor element (T2). As a result, since an amount of heat generation can be reduced as compared with the case of the related art where the flywheel diode is employed, the energy loss can be reduced.

DESCRIPTION OF EMBODIMENTS

Figure 1:
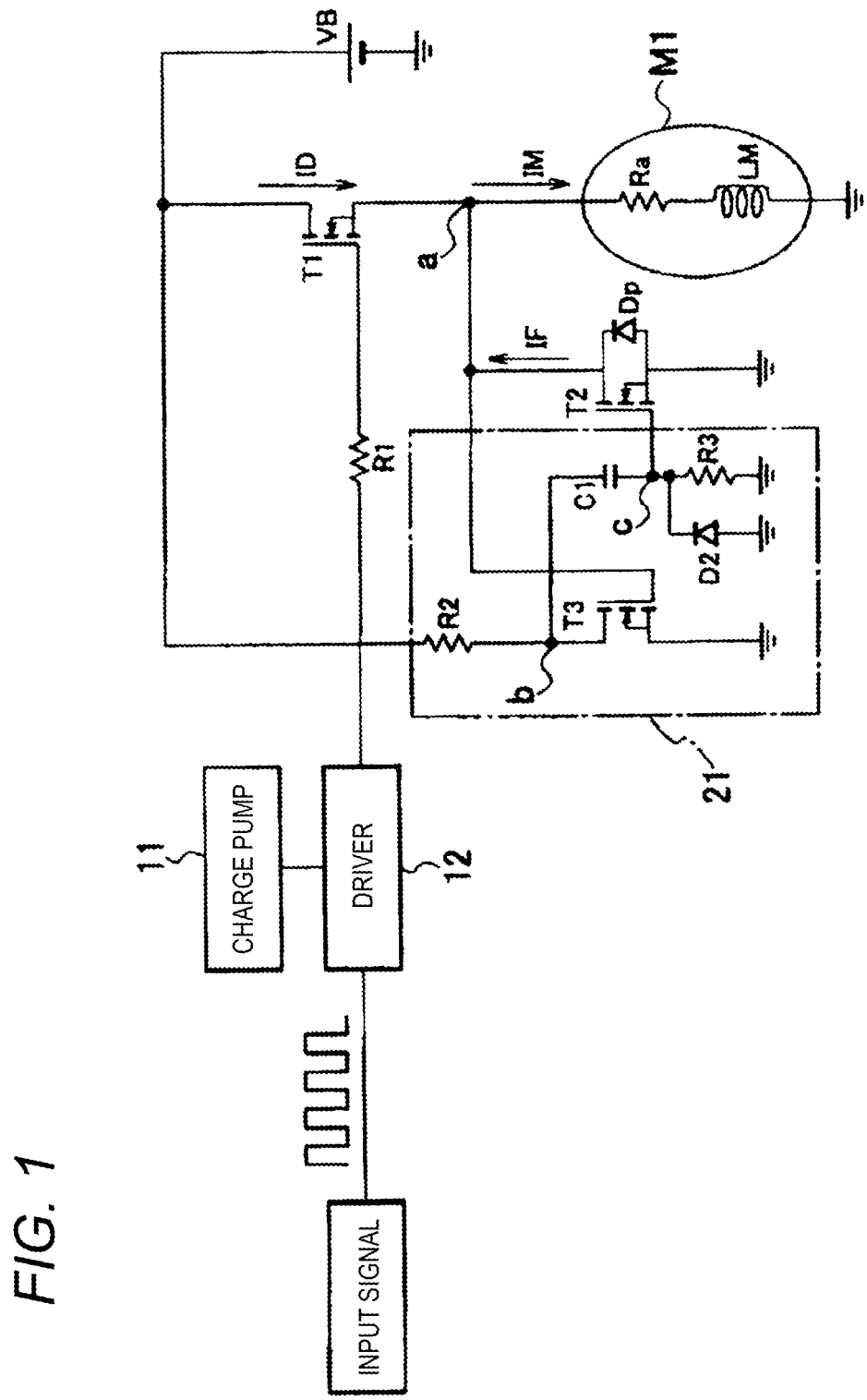
FIG. 1 A circuit diagram showing the configuration of a load circuit including a power supply device according to the first embodiment of the invention.

Hereinafter, embodiments according to the invention will be explained with reference to drawings. FIG. 1 is a circuit diagram showing the configuration of a load circuit including a power supply device according to the first embodiment of the invention. As shown in FIG. 1, the load circuit according to this embodiment includes a series connection circuit formed by a DC power supply VB, an electronic switch T1, and a motor M1 (motor load). The DC power supply VB is such as a battery to be mounted on a vehicle, for example. The electronic switch T1 is such as a MOSFET. The motor M1 is used for driving a radiator fan etc. The gate of the electronic switch T1 is connected to a driver 12 via a resistor R1. The driver 12 is supplied with electric power from a charge pump 11.

When an input signal having a predetermined on/off cycle is supplied to the driver 12, the driver 12 outputs the output voltage of the charge pump 11 to the gate of the electronic switch T1 to thereby drive the electronic switch T1 with a predetermined duty ratio according to the PWM control. As a result, since the electric power supplied to the motor M1 is controlled, the rotation driving of the motor M1 can be controlled. An armature resistance of the motor M1 is depicted as Ra and an inductance of the motor M1 is depicted as LM.

An N-type MOSFET (T2: semiconductor element) is provided in parallel to the motor M1. The drain (first main electrode) of the MOSFET (T2) is connected to a point a (first connection point) which is provided between the electronic switch T1 and the motor M1, and the source (second main electrode) of the MOSFET (T2) is grounded. The cathode of the parasitic diode Dp of the MOSFET (T2) is connected to the point a and the anode of the parasitic diode Dp is grounded.

The gate (control electrode) of the MOSFET (T2) is connected to a control circuit 21, whereby the on/off operation thereof is controlled by the control circuit 21.

The control circuit 21 includes a transistor T3 (MOSFET in this embodiment), a resistor R2 (first resistor), a resistor R3 (second resistor), a capacitor C1 and a diode D2.

One end of the resistor R2 is connected to the positive electrode terminal of the DC power supply VB and the other end thereof is grounded via the transistor T3. A point b (second connection point) which is provided between the resistor R2 and the transistor T3 is connected to the one end of the capacitor C1. The gate of the transistor T3 is connected to the point a.

A point c (third connection point) which is the other end of the capacitor C1 is connected to the gate of the MOSFET (T2), connected to the ground via the resistor R3 and further connected to cathode of the diode D2. The anode of the diode D2 is grounded.

The control circuit 21 turns the MOSFET (T2) on during a part of a period during which the electronic switch T1 is placed in an off state to thereby reduce an amount of heat generated from the parasitic diode Dp, whereby energy loss can be reduced.

Hereinafter, the explanation will be made as to the operation of the power supply circuit according to the first embodiment. FIGS. 3(a) to 3(e) are timing charts showing waveforms of respective signals of the power supply circuit according to the first embodiment. FIG. 3(a) shows the waveform of the input signal supplied to the driver 12, FIG. 3(b) shows voltage waveforms generated at the point a, point b and point c, FIG. 3(c) shows the waveform of a current IM flowing through the motor M1, FIG. 3(d) shows the waveform of a current ID flowing through the electronic switch T1, and FIG. 3(e) shows a circulation current IF flowing through the MOSFET (T2) or the parasitic diode Dp.

In FIG. 1, in a state that the electronic switch T1 has not been driven yet, the voltage at the point a is 0V and the transistor T3 is in an off state. Further, since the gate of the MOSFET (T2) is grounded via the resistor R3, the MOSFET (T2) is in an off state.

When the driver 12 outputs a PWM signal to thereby supply a driving signal to the gate of the electronic switch T1, the electronic switch T1 repeats on/off states with a predetermined duty ratio. That is, as shown in FIG. 3(a), the electronic switch T1 repeats the on/off states with a constant period. When the electronic switch T1 is turned on at a time point t1 shown in FIG. 3(a), the voltage at the point a increases almost to the output voltage of the DC power supply VB as shown in FIG. 3(b). Further, the current ID flowing through the electronic switch T1 gradually increases as shown in FIG. 3(d). Similarly, the current IM flowing through the motor M1 gradually increases as shown in FIG. 3(c).

As a result, since the gate voltage of the transistor T3 increases, the transistor T3 is turned on to thereby connect the point b to the ground. Thus, the voltage at the point c which is the gate of the MOSFET (T2) becomes lower than the ground level by the forward direction voltage (hereinafter referred to VF2) of the diode D2, whereby the MOSFET (T2) is turned off. That is, the MOSFET (T2) is turned off when the electronic switch T1 is turned on.

Next, when the electronic switch T1 is turned off at a time point t2 shown in FIG. 3(a), the voltage at the point a abruptly reduces in a manner of exceeding the ground level to the negative voltage side as shown in FIG. 3(b). That is, since the circulation current flows through a path from the motor M1 to the motor M1 via the ground, the parasitic diode Dp and the point a due to the electromagnetic energy having been accumulated in the inductance LM of the motor M1. In this case, the current IM flowing through the motor M1 reduces gradually as shown in FIG. 3(c), and the circulation current IF same as the current IM flows through the parasitic diode Dp as shown in FIG. 3(e).

When the voltage at the point a reduces to a level lower than the ground level by about 0.7 V to 1 V, the voltage at the point a is clamped by the parasitic diode Dp of the MOSFET (T2) and hence prevented from being reduced any more (see a symbol q1 of FIG. 3(b)). That is, the parasitic diode Dp acts as a flywheel diode.

Then, since the transistor T3 is turned off due to the voltage reduction at the point a, the connection between the point b and the ground is interrupted and hence the voltage at the point b increases. The voltage at the point c increases in accordance with the increase of the voltage at the point b in a manner that the voltage at the point c is lower than the voltage at the point b by about 0.7 V (see t2 to t3 in FIG. 3).

The MOSFET (T2) is turned on due to the increase of the voltage at the point c, whereby the circulation current IF of the motor M1 stops flowing through the parasitic diode Dp and flows through a path from the motor M1 to the motor M1 via the ground, the MOSFET (T2) and the point a. Thus, the power loss due to the parasitic diode Dp is replaced by the power loss due to the on-resistance of the MOSFET (T2). Supposing that the on-resistance of the MOSFET (T2) is 5 [mΩ] and the circulation current IF is 10 A, as an example, the power loss becomes 0.5 W.

In contrast, supposing that the voltage drop in the forward direction of the parasitic diode Dp is 0.7V, since the power loss becomes 7 W when the circulation current of 10 A flows, the power loss can be 1/14 by using the MOSFET (T2). The circulation current becomes the maximum when the electronic switch T1 is turned off and thereafter reduces with a constant rate. Thus, the power loss abruptly reduces in proportional to the square of the circulation current IF (IF2).

When the circulation current IF disappears at a time point t4 (see FIG. 3(b)) upon the lapse of a time period Ty after the time point t2 where the electronic switch T1 is turned off, the motor M1 generates the power by the rotation due to the inertial force of the armature to thereby increases the voltage at the point a (see a symbol q2 in FIG. 3(b)). The transistor T3 is turned on due to the voltage increase at the point a, whereby since the voltage at the point c becomes equal to or lower than the ground level, the MOSFET (T2) is turned off. Thus, the current path from the point a to the ground via the MOSFET (T2) is interrupted. In other words, since the MOSFET (T2) is turned off at the time point where the electromagnetic energy accumulated in the inductance LM of the motor M1 disappears, the inertial energy of the armature can be prevented from being wasted. Further, the MOSFET (T2) can be surely turned off before a time point t5 where the electronic switch T1 is turned on next.

Figure 3:
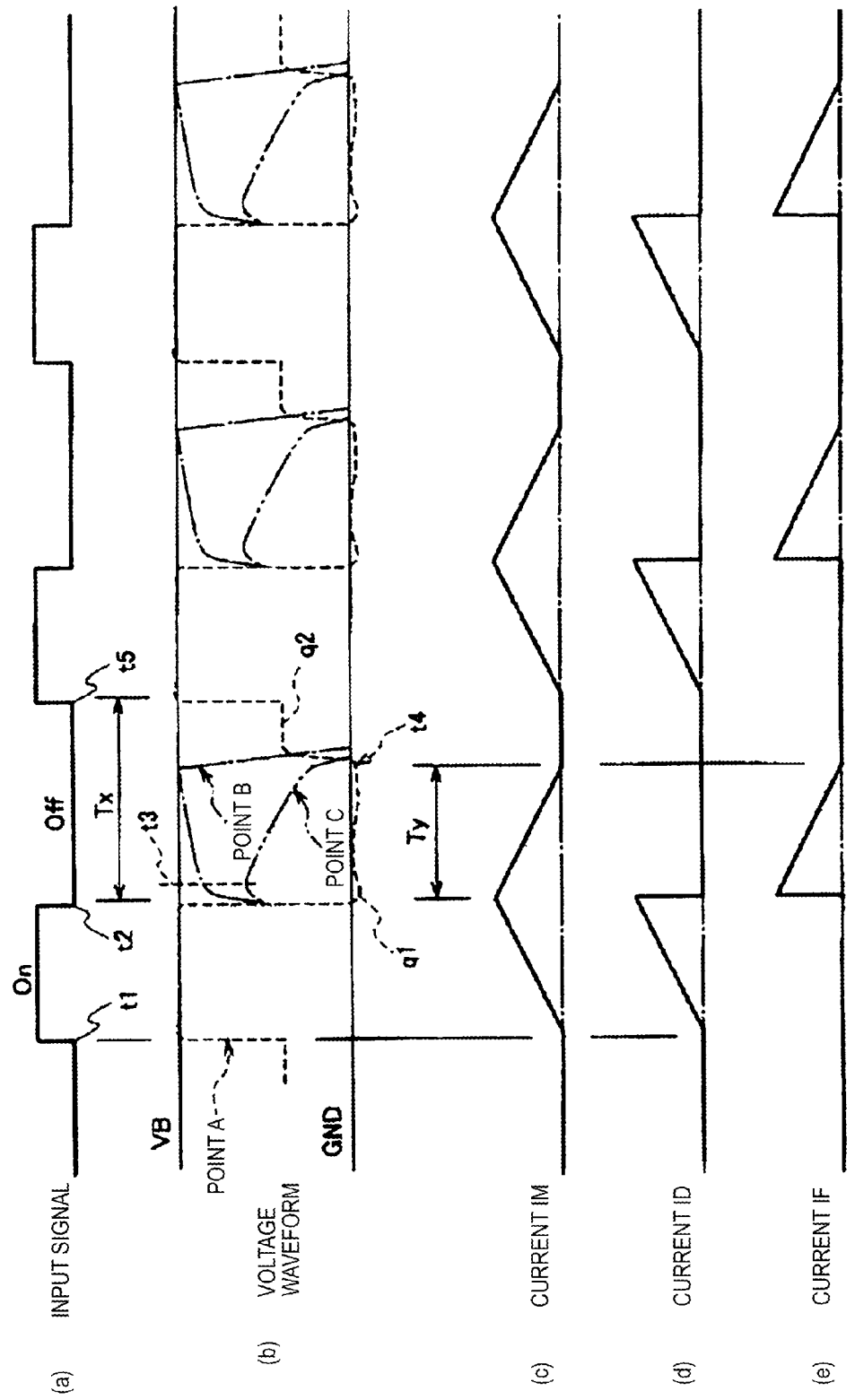
FIG. 3 (a) to (e) are timing charts showing respective waveforms of the load circuit including the power supply device according to the embodiment of the invention.
Figure 4:
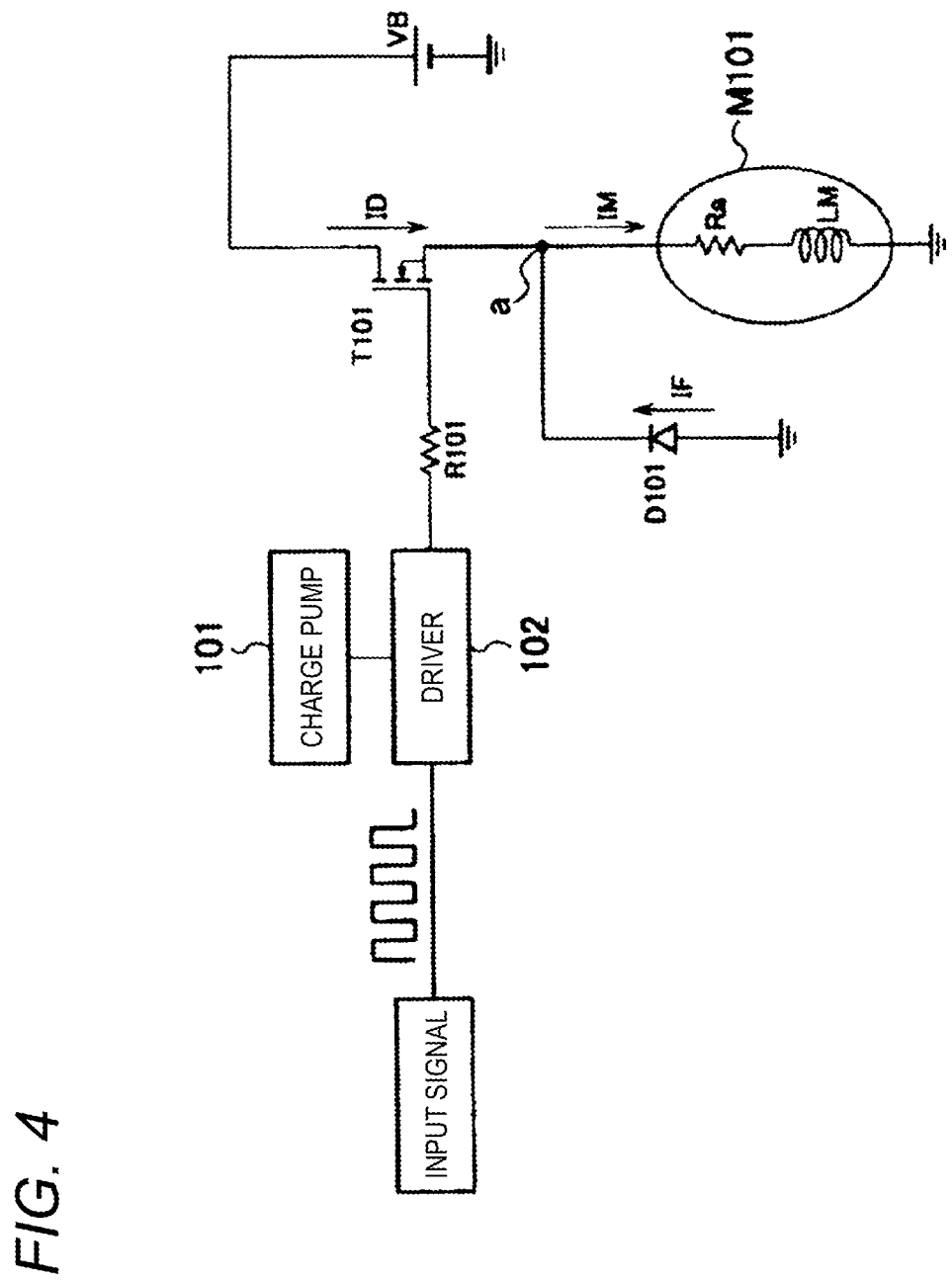
FIG. 4 A circuit diagram showing the configuration of a load circuit including a power supply device of a related art.

Further, although the voltage at the point c is raised in accordance with the increase of the voltage at the point b immediately after the turning-off of the electronic switch T1 (see t2 to t3 in FIG. 3), since the capacitor C1 is charged by a current flowing through a path from the DC power supply VB to the ground via the resistor R2, the capacitor C1 and the resistor R3, the voltage at the point c reduces with the time lapse (see t3 to t4 in FIG. 3). In this case, a time constant T of the current charging the capacitor C1 becomes T=C1*(R2+ R3). Thus, when the time constant T is set to a small value, the MOSFET (T2) can be turned off before the voltage at the point a increases after the disappearance of the circulation current. In other words, the MOSFET (T2) can be turned off at the time point before the electromagnetic energy disappears by suitably changing the time constant τ.

That is, according to the invention, the positive voltage is started to be applied to the gate of the MOSFET (T3) when the electronic switch T1 is shifted to the off state from the on state and the voltage at the point a reduces to the level equal to or lower than the ground level. Then, the application of this positive voltage is stopped to thereby turn the MOSFET (T2) off when a shorter time period has elapsed between a time period (first time period) from the application of this positive voltage to the start of the increase of the voltage at the point a and a time period (second time period) until the constant time period determined by the time constant τ elapses after the application of this positive voltage.

After the turning-off of the MOSFET (T2), the circulation current IF flows through the parasitic diode Dp. In this case, although there is a fear about the power loss due to the parasitic diode Dp, since the circulation current IF becomes small after the lapse of the time period determined by the time constant τ, the power loss due to the parasitic diode Dp becomes quite small.

In this manner, according to the power supply device of the first embodiment, the MOSFET (T2) is provided in parallel to the motor M1. At the time of driving the electronic switch T1 by the PWM control to thereby supply the power to the motor M1, the MOSFET (T2) is turned on during a part of the period during which the electronic switch T1 is placed in the off state. Thus, when the electronic switch T1 is placed in the off state, the circulation current IF flowing through the motor M1 is circulated via the MOSFET (T2). As a result, the energy loss can be remarkably reduced as compared with the case of the related art where the circulation current circulates via the flywheel diode.

Further, at the time of executing the PWM control, since the MOSFET (T2) is turned on after the electronic switch T1 is turned off and the MOSFET (T2) is turned off before the electronic switch T1 is turned on, such a phenomenon can be surely prevented from occurring that both the MOSFET (T2) and the electronic switch T1 are simultaneously turned on.

In the aforesaid first embodiment, the lapsed time period Ty (see FIG. 3(c)) required until the circulation current disappears is set to be shorter than the turn-off time period Tx of the electronic switch T1 (see FIG. 3(c)). However, even if the time period Tx becomes equal to or smaller than the time period Ty, the aforesaid control can be realized so long as the T1 is turned on to thereby increase the voltage at the point a.

In order to realize such the control, the gate voltage (voltage at the point c) of the MOSFET (T2) is required to become sufficiently small until the electronic switch T1 is turned on. If the gate voltage of the MOSFET (T2) is sufficiently large when the electronic switch T1 is turned on, the current flows through a path from the DC power supply VB to the ground via the electronic switch T1, the point a and the MOSFET (T2), which is the same phenomenon as the case where the load side wiring is short-circuited and grounded. In order to avoid such the phenomenon, it is required to perform such a control of charging the capacitor C1 to reduce the voltage at the point c.

Figure 2:
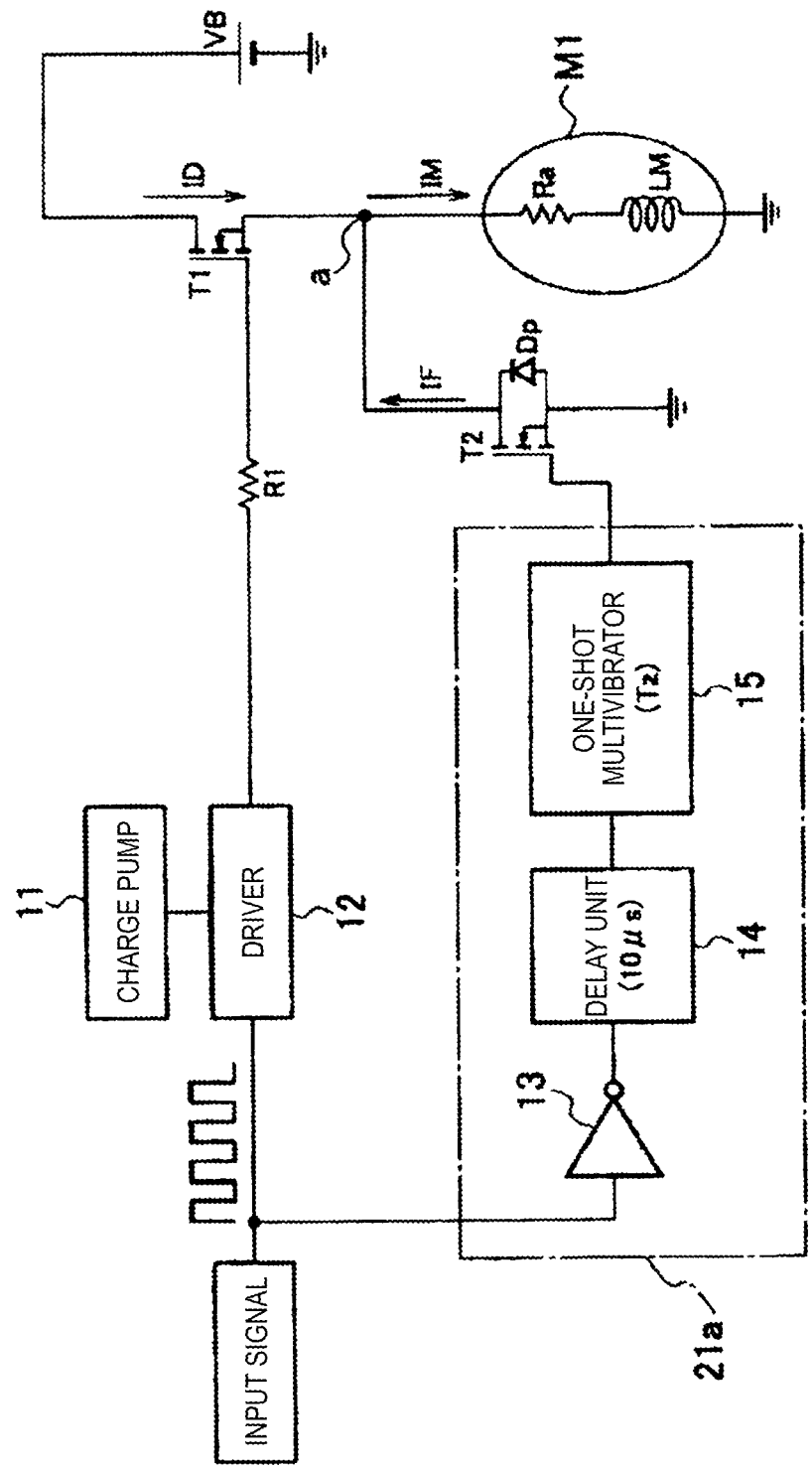
FIG. 2 A circuit diagram showing the configuration of a load circuit including a power supply device according to the second embodiment of the invention.

Next, the second embodiment of this invention will be explained. FIG. 2 is a circuit diagram showing the configuration of a load circuit including a power supply device according to the second embodiment of the invention. The power supply device shown in FIG. 2 differs from FIG. 1 in a point that the control portion for controlling the turning-on/off operation of the MOSFET (T2) is changed from the analog circuit to a digital circuit.

A control circuit 21a according to the second embodiment includes an inverter circuit 13 which inverts a PWM signal having a predetermined on/off duty ratio to generate an inverted signal, a delay unit 14 which delays the output signal from the inverter circuit 13 by a predetermined time period (for example 10 [μs]), and an one-shot multivibrator 15 which outputs an on-signal of a constant time period (Tz) in synchronous with the rising timing of the PWM signal as a trigger output from the delay unit 14. The output signal of the one-shot multivibrator 15 is supplied to the gate of the MOSFET (T2).

Thus, the one-shot multivibrator 15 outputs to the gate of the MOSFET (T2), as the output signal, a signal of "H" level with the constant time period Tz upon the lapse of 10 [μs] after the input signal supplied to the driver 12 is interrupted.

In this case, the constant time period Tz is set to be shorter than each of the time period Tx and the time period Ty shown in FIG. 3. Thus, the MOSFET (T2) can be turned on during a part of the time period during which the electronic switch T1 is placed in the off state to thereby flow the circulation current via the MOSFET (T2). In the case where the circulation current IF still exists after the lapse of a time period of (Tz+10 [μs]) after the turning-off of the electronic switch T1, the circulation current flows through the parasitic diode Dp.

In this manner, according to the power supply device of the second embodiment, since the control circuit 21a is configured by the digital circuit including the one-shot multivibrator 15, it is possible to obtain an effect that the circuit can be designed by the easier method in addition to the aforesaid effects described in the first embodiment.

Although the explanation is made as to the power supply device according to the invention based on the embodiments shown in the drawings, the invention is not limited thereto and the configuration of each of the respective portions may be replaced by an arbitrary configuration having the similar function.

For example, although the aforesaid embodiments are explained as to the case of driving the radiator fan to be mounted on a vehicle as an example, the invention is not limited thereto and may be applied to a case of driving the load of the motor under the PWM control by using the DC power supply.

Although the invention is explained in detail with reference to the particular embodiments, it will be apparent for those skilled in the art that various changes and modifications are possible without departing from the spirit, range or intentional range of the invention.

This invention is based on Japanese Patent Application (Japanese Patent Application No. 2008-329693) filed on Dec. 25, 2008, the contents of which are incorporated herein by reference.

INDUSTRIAL APPLICABILITY

This invention is quite useful since the energy loss can be reduced at the time of driving the motor by using the PWM control.

REFERENCE SIGNS LIST 11 charge pump
12 driver
13 inverter circuit
14 delay unit
15 one-shot multivibrator
21, 21a control circuit (control portion)
VB DC power supply
T1 electronic switch
T2 MOSFET (semiconductor element)
T3 transistor
Dp parasitic diode
D2 diode
C1 capacitor
R1 resistor
R2 resistor (first resistor)
R3 resistor (second resistor)
M1 motor (motor load)
Ra armature resistor
LM inductance

The invention claimed is:

1. A power supply device, comprising:
    an electronic switch provided on a wiring which connects a DC power supply to a motor load;
    a driving portion that controls the electronic switch with PWM to drive the motor load;
    a semiconductor element that has a parasitic diode and is disposed in parallel to the motor load so that a forward direction of the parasitic diode is in opposite to a flowing direction of a current flowing through the motor load; and
    a control portion that controls the semiconductor element so as to be turned on during a part of a period during which the electronic switch is placed in an off state under a control with the PWM,
    wherein in a case where electromagnetic energy accumulated in an inductance of the motor load disappears until the electronic switch is turned on again after the electronic switch is turned off, the part of the period is set to a period from a time point where a voltage at a first connection point for connecting between the electronic switch and the motor load reduces to a level equal to or lower than a grounding level after the electronic switch is turned off to a time point before the voltage at the first connection point starts increasing due to disappearance of the electromagnetic energy.

2. The power supply device according to claim 1, wherein the semiconductor element includes:
    a first main electrode which is connected to a first connection point for connecting between the electronic switch and the motor load;
    a second main electrode which is connected to a ground; and
    a control electrode to which a control signal is input,
    wherein the semiconductor element is turned on when a positive voltage is applied to the control electrode; and
    wherein the control portion starts applying the positive voltage to the control electrode when the voltage at the first connection point reduces to the level equal to or lower than the grounding level after the electronic switch is shifted to an off state from an on state, and stops application of the positive voltage when a shorter time period has elapsed between a first time period from the application of the positive voltage to a start of increase of the voltage at the first point and a second time period until a constant time period elapses after the application of the positive voltage.

3. The power supply device according to claim 2, wherein the semiconductor element is an N-type field effect transistor which includes a drain as the first main electrode, a source as the second main electrode, and a gate as the control electrode;
    wherein the control portion includes a serial connection circuit which is formed by a first resistor and a transistor;
    wherein the serial connection circuit is disposed between the DC power supply and the ground; and
    wherein a control input terminal of the transistor is connected to the first connection point, a second connection point for connecting between the first resistor and the transistor is connected to the ground via a serial connection circuit formed by a capacitor and a second resistor, and a third connection point for connecting between the capacitor and the second resistor is connected to a gate of the semiconductor element.

4. The power supply device according to claim 1, wherein the control portion includes:
    an inverter circuit which generates an inverted signal of a PWM signal;
    a delay circuit which delays an output signal of the inverter circuit by a predetermined time; and
    an one-shot multivibrator which outputs an on-signal with a constant time period in synchronous with a rising timing of the PWM signal as a trigger output from the delay circuit.

* * * * *